Feb. 23, 1954

A. CRAWLEY ET AL 2,670,090

AUTOMATIC DISCHARGE APPARATUS FOR BOOK
ROUNDING MACHINES AND THE LIKE

Filed Aug. 15, 1950

INVENTOR.
Arthur Crawley
BY Jack N. Binns
Thomas E. Dugle
Wood, Arey, Herron & Evans
ATTORNEYS.

Feb. 23, 1954

A. CRAWLEY ET AL 2,670,090

AUTOMATIC DISCHARGE APPARATUS FOR BOOK
ROUNDING MACHINES AND THE LIKE

Filed Aug. 15, 1950

INVENTOR.
Arthur Crawley
BY Jack N. Binns
Thomas E. Dugle
Wood, Arey, Herron & Evans
ATTORNEYS.

Patented Feb. 23, 1954

2,670,090

UNITED STATES PATENT OFFICE 2,670,090

AUTOMATIC DISCHARGE APPARATUS FOR BOOK ROUNDING MACHINES AND THE LIKE

Arthur Crawley, Jack N. Binns, and Thomas E. Dugle, Cincinnati, Ohio; said Binns and said Dugle assignors to said Crawley Application August 15, 1950, Serial No. 179,626

4 Claims. (Cl. 214—147)

This invention relates generally to book binding machinery and resides in an automatic discharge apparatus which has been developed primarily for book rounding and forming machines; however it will be understood that the structure, without substantial change, can be incorporated in other automatic machines having the same general characteristics.

As disclosed in conjunction with a book rounding machine, the automatic discharge mechanism is adapted to operate in synchronism with the rounding machine to retrieve and discharge from the machine the successive books after a rounding and backing operation is performed upon them. Rounding machines of this class operate continuously and are fed by an operator who places the books individually in the machine in a position to be engaged by feed rollers; upon engagement, the book is rounded during an automatic cycle of operation and disengaged at completion of the cycle. In the past it was necessary for the operator to reach into the machine and remove the rounded book before the beginning of the next cycle in order to prevent jamming of the machine or destruction of the finished book. While hand removal of the books is not particularly dangerous, the necessity of reaching into the machine at the end of each cycle to retrieve the finished book in time, naturally has required that the production speed of the machine be limited to the reasonable speed of the operator, with a margin of safety to spare.

A primary object of the invention has been to provide a mechanical discharge apparatus, which by operation automatically in time with the cycles of a rounding machine, greatly increases the production rate and at the same time relieves the operator of the tedious hand removal of the books. In practice it has been found that the production rate of a standard machine, without change in structure, can be approximately doubled by equipping it with the automatic discharge mechanism. Due to automatic discharge, the operator is required merely to feed successive books into the machine, whereupon they are rounded and delivered by the apparatus automatically to a discharge station or to a conveyor for further processing.

The machine for which the discharge apparatus is expressly intended is of the type disclosed in the patent of Edwin Crawley, No. 372,128, issued October 25, 1887, which is widely used in the industry. This machine is automatic in operation and in general includes a pair of feed rollers, a swinging clamp or sweep which engages the book as it is fed inwardly by the rollers, and a rounding bar which is disposed inwardly of the machine in a position to engage the rearward edge of the book when the sweep swings to its rearward position. In this position the sweep remains stationary with the book clamped firmly between its jaws and with the edge of the book presented to the rounding bar which swings through an arc corresponding to the curvature to be formed. After the rounding bar performs its operation, the sweep swings forwardly toward the feed rollers carrying with it the finished book, but before reaching its original position behind the rollers, the sweep jaws release the book, causing it to drop behind the sweep to a pair of support rails. Formerly the book was retrieved by the operator who reached over the sweep while in its forward position to permit the next book to be clamped and swung rearwardly for finishing.

The automatic discharge apparatus executes substantially the same retrieving operation formerly performed by the operator except that it is arranged to reach into the machine from the rear instead of from the front. It constitutes a cam driven articulated arm having fingers which pass between the support rails and reside below them to pick up the finished book. These fingers are swung by the arm upwardly above the support rails and are then moved rearwardly just prior to the rearward motion of the sweep so as to withdraw the book as the sweep advances with the next one engaged between its jaws. When completely clear of the operating station the book is elevated and by a series of compound movements, it is deposited upon an elevated roller conveyor for discharge by gravity.

In order to prevent the book from being dislodged from the fingers during transfer to the conveyor, it is clamped down upon the fingers by a spring limb. This limb has its inner end fixed to one of the articulated arm sections and extends above the pickup fingers so that the fingers press the book against the limb when they swing upwardly to pick up the book from the support rails. The fingers remain in this position with the book firmly clamped during the retracting movement of the arm and during its advancement to an elevated position above the conveyor. The fingers then move downwardly between conveyor rollers which are spaced to receive them, then the spring limb releases its hold upon the book and permits it to be deposited upon the rollers for discharge by gravity. The articulated arm sections are then pivoted by their cams to move the fingers from the conveyor through substantially the same sequence of motions in reverse order to bring the fingers back to their original position beneath the support rails to receive the next book.

Further objects of the invention have been to provide a mechanism which can be installed upon rounding machines either as an integral part of a new machine or as an attachment to existing machines; also to provide a simple rugged arm assembly which is adapted to be operated at high speed but which is sufficiently light in weight to reduce the forces of momentum developed by the reciprocating parts and thereby avoid excessive vibration and wear of the parts.

The various movements executed by the rounding machine are generated by a series of cams and companion links and levers, the cams being mounted in common upon a main cam shaft and properly correlated with one another to move the parts in timed sequence with one another. The cam shaft is driven continuously from a source of power so that the machine performs successive cycles of operation automatically.

The articulated arm consists of three sections pivoted to one another, each section being individually actuated relative to the other sections by a respective cam which is connected to its arm. The cams are mounted in common upon a shaft which is driven in unison with the main cam shaft of the machine. In its preferred form the cam shaft and arm assembly is mounted upon a base plate which is adjustably fixed to the base of the rounding machine and the arm cam shaft is driven in unison with the cam shaft of the machine by a chain and sprocket drive.

The main section of the articulated arm has its lower end pivotally mounted upon the base plate and occupies a substantially horizontal position overhanging the machine, and the pickup fingers are mounted upon the swinging end of the secondary arm. The combined swinging movements of the arm sections and fingers are of course related to one another and to the operating cycles of the machine so as to engage and discharge the finished books in time with the operating cycles of the machine.

Further features and advantages of the invention will be more fully disclosed in the following specification in conjunction with the drawings. In the drawings.

*Rounding machine structure*

Since the discharge mechanism functions in cooperation with the rounding machine, a description of its essential operations and parts is necessary to complete the disclosure. The structural details of the rounding machine itself are not relevant to the invention and have been omitted from the brief description following; however, it will be understood that the machine follows generally the teachings of the above noted patent to which attention is invited.

Figure 1:
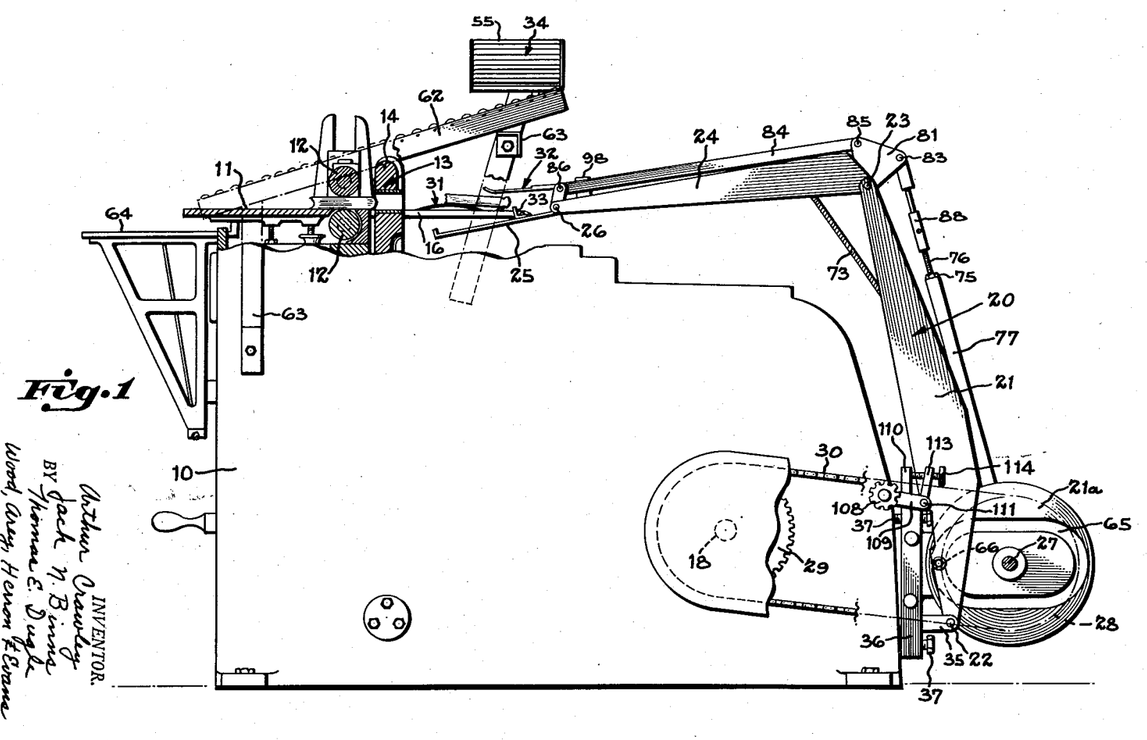
Figure 1 is a general side elevation of a book rounding machine with the automatic discharge apparatus shown in the position it assumes at the start of a discharge operation, the sweep bar being shown in position forwardly of the pickup fingers to receive and clamp the next book as it is fed inwardly by the feed rollers.

As shown in Figure 1 the rounding machine includes a base 10 having a work supporting tray 11 at its forward end for supporting the books as they are fed manually into the machine by the operator. At the rearward edge of tray 11 there is mounted a pair of rollers 12—12 arranged to grip the books and by rotation of the rollers, to feed them rearwardly to a position to be clamped between the open jaws of a swinging sweep or clamp assembly 13. The upper feed roller is movable vertically with respect to the lower roller to permit the book to be slipped between them at the beginning of each cycle. The initial position of the book is regulated by a guide member (not shown) which is located behind the rollers and arranged to engage the rearward edge of the book and serve as a stop as the operator pushes it between the separated rollers. The guide member rises to a position above the path of the sweep 13 when the rounding cycle begins so as to permit the sweep to occupy approximately the position behind the rollers previously occupied by the guide member.

The books to be rounded and backed are partially bound, their rearward edge having previously been stitched and glued with the leaf sections of the book stacked and trimmed, thus defining a straight bound edge. It is the function of the rounding machine to deform the bound edge to a convex arc and to form at the edges of the rounded edge a bead or backing shoulder to accommodate the side covers and backing covers which are applied in an operation following the rounding step.

At the start of the rounding and backing operation, the upper feed roller descends upon the book and grips it under pressure between the rollers; then the guide member ascends and the feed rollers are rotated in a direction to feed the book rearwardly. The combined pressure and rolling action of the rollers causes the leaf sections to creep with respect to one another in such manner that the bound edge becomes convex and the forward edge concave.

As shown in Figure 1 the sweep 13 at this time swings into position immediately behind the feed rollers with its upper jaw 14 raised to receive and clamp the rounded book as it emerges from the feed rollers. When the book reaches a predetermined position between the jaws, the upper jaw moves downwardly to clamp the book under pressure engagement, then the sweep carrying the book between its jaws, swings rearwardly (Figure 2) to present the rearward edge of the book to the rounding bar 15 where the rounding and backing operation is completed. Sweep 13 in this position remains stationary and the rounding bar swings repeatedly through an arc with its concave working face engaged against the rounding. The working face describes a radius corresponding to the book rounding and by virtue of the pressure imposed upon the book by the sweep jaws, the rounding is deformed slightly so as to develop the bead or back shoulder 17 (Figure 10) along the opposite edges of the rounding.

After the rounding bar performs its operation the sweep 13 begins to swing back to the starting position and during its return movement its clamp jaw 14 moves upwardly to release the finished book and deposit it upon the spaced support bars 16—16 which are provided with positioning springs hereinafter described. The finished book now remains upon the support bars for discharge from the machine and in the manually operated machines it was necessary at this point for the operator to reach over the sweep and rollers to retrieve the finished book before the sweep again begins its rearward swing for the next operation. The present discharge apparatus is arranged to retrieve the book automatically at this point by operation in time with the movements of the sweep so as to perform substantially the same operation formerly required of the operator, thus speeding up production and eliminating the danger of injury to the operator or jamming of the machine by failure to remove the book in time with the cycles of the continuously running machine.

The movements of the feed rollers, guide member, sweep, rounding bar, and other component parts of the machine are developed by cams and linkages as disclosed in the prior patent. The cams are mounted in common upon a cam shaft 18 which is driven by a motor through suitable reduction gearing. A clutch is interposed in the drive system to permit the machine to be stopped immediately in emergency.

Discharge apparatus

In general, the discharge apparatus constitutes an articulated arm indicated generally at 20, arranged to execute continuously a series of compound movements in cycles timed to the operating cycles of the rounding machine. The arm 20 constitutes a primary arm section 21 having its lower end pivoted upon a pivot shaft 22 mounted with respect to the base of the machine near the floor. Upon the upper or swinging end of arm 21 there is pivoted as at 23 a secondary arm 24 which carries upon its swinging end a series of pickup fingers 25, which are pivotally connected to the secondary arm as at 26. The respective arms and pickup fingers are independently angulated with respect to one another by cams, there being provided a cam 21a for the primary arm, a cam 24a for the secondary arm and a cam 25a for the pickup fingers. These respective cams are secured upon a cam shaft 27 journalled in bearing blocks at the lower portion of the machine base. The cam shaft is driven by a sprocket 28 connected to a driving sprocket 29 by a sprocket chain 30. Sprocket 29 is keyed to the main cam shaft 18 of the rounding machine and both sprockets are of the same pitch diameter to drive cam shaft 27 in unison with shaft 18 and thus operate the articulated arm in synchronism with the operating parts of the machine.

Operation

Figure 2:
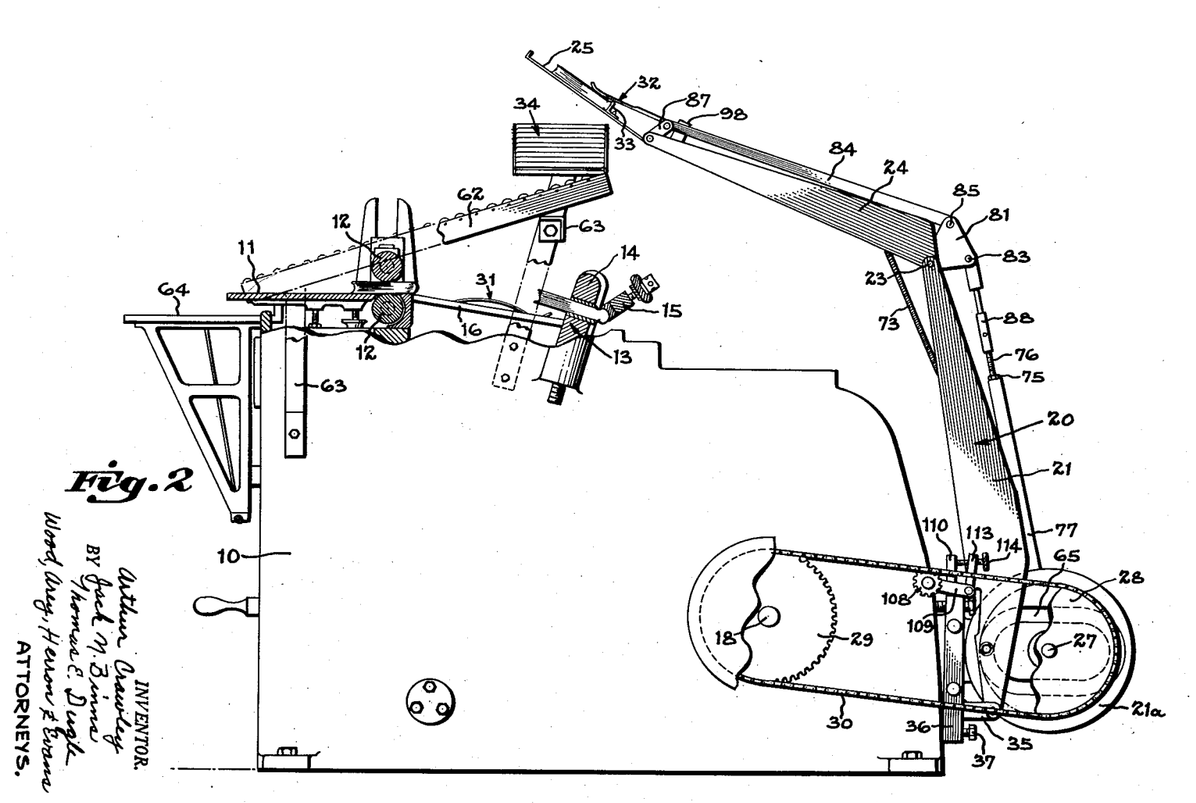
Figure 2 is a general fragmentary side elevation similar to Figure 1, showing the discharge apparatus in its final position above the conveyor about to deposit the book thereon, the sweep being shown in its rearward position with a book clamped between its jaws and presented to the rounding tool.

The operating cycle of the discharge apparatus is best disclosed in Figures 1 and 2 and in the diagrams illustrated in Figures 13 to 16 inclusive which show the various positions of the arms in conjunction with the movements of the rounding machine parts. In Figure 1, showing the beginning of an operating cycle, the sweep assembly 13 is in its forward position adjacent to the feed rolls 12 with the jaws open and with a finished book resting upon the support rails. At this point the primary arm is in its forward limit of travel and the secondary arm is lowered to the limit of its stroke, with the fingers poised below the support rails in position to lift the finished book from the rails. It will be noted in Figures 10 and 11 that there is provided a pair of flat leaf springs 31—31, one for each support rail, which are configurated to support the book in an angular position with respect to the rails. Mounted upon the end of the secondary arm in a position to overhang the fingers is a clamp spring 32 which holds the book in position upon the fingers during transfer from the rails. In the initial position shown in Figures 1 and 10, the fingers and clamp spring from an open throat straddling the book.

Before the sweep 13 begins its rearward swing with the next book, the pickup fingers swing upwardly toward the clamp spring 32, lifting the book from the support springs. Should the book slide rearwardly down the inclined fingers it will be brought to rest against the stop lugs 33 mounted upon the rearward portion of the fingers. As the fingers move upwardly, the upper surface of the book is engaged against the clamp spring to prevent dislodgement of the book as it is moved to the conveyor.

With the fingers at their upper swing limit as determined by cam 25a, the sweep which has now engaged the next book, begins its rearward swing and at the same time the primary arm also begins its rearward motion by operation of cam 21a to retract the fingers and book ahead of the moving sweep. The rounding machine now continues its second cycle of operation and concurrently the primary arm continues its rearward swing until it reaches its rearward limit Figure 15.

Figures 13, 14, 15, 16:
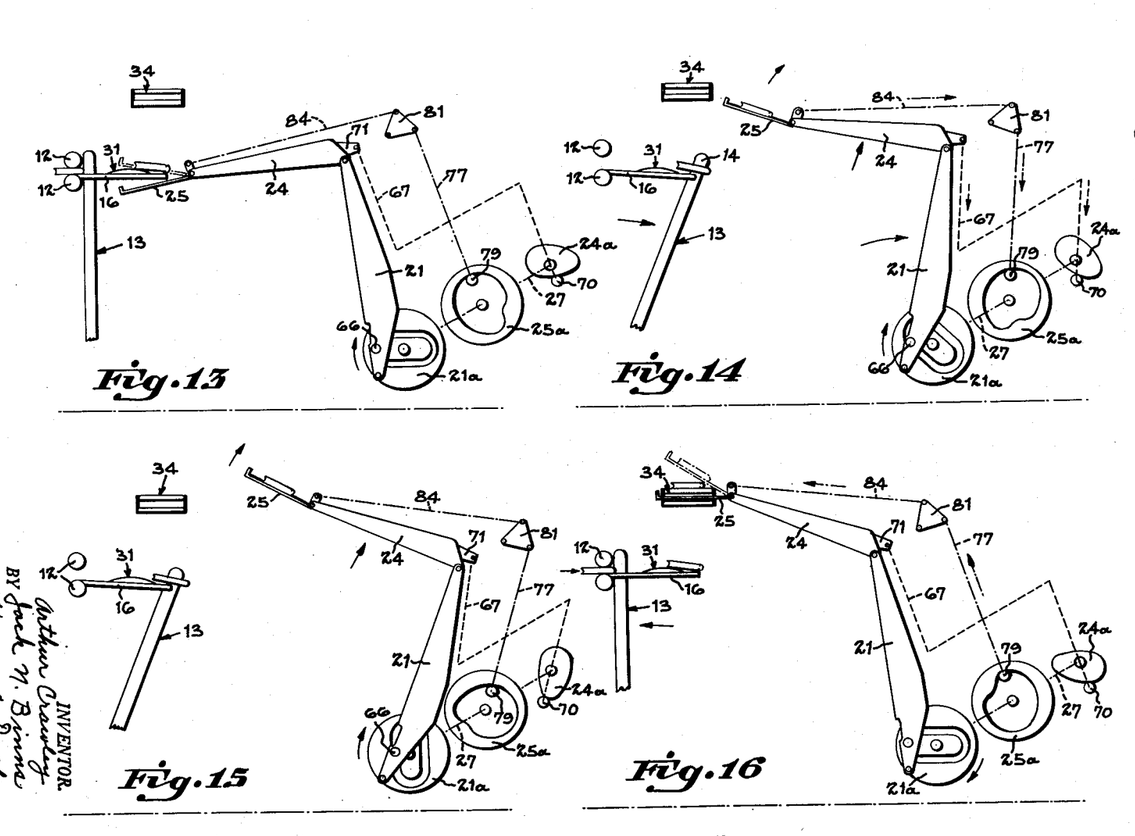
Figures 13 to 16 inclusively are diagrammatic views illustrating the various positions of the articulated arm and cams with respect to the rounding machine during a cycle of operation.

At this point cam 21a begins to swing the primary arm forwardly and the secondary arm begins its upward swing with the fingers stationary in clamping engagement with the book. As the fingers approach the conveyor, the secondary arm reaches its upper travel limit, and the fingers begin to swing upwardly and come to rest with the book poised above a conveyor 34 as shown in Figure 16. At this point both arm sections remain stationary while the pickup fingers swing downwardly between the rollers of the conveyor section to deposit the book on the rollers for delivery from the machine. It will be noted that the clamp spring 32 remains stationary as the fingers swing downwardly so as to release the book and permit it to move by gravity down the conveyor section.

The primary arm now begins its rearward swing, withdrawing the fingers from the conveyor and upon reaching its rearward limit the secondary arm is lowered and the primary arm again swings forwardly to reposition the fingers beneath the support rails as the sweep begins its return movement with the next finished book in its jaws. The return movements of the articulated arm sections and fingers are approximately the same as those executed during the transfer of the book to the conveyor except the movements are in reverse order. As the rounding machine sweep passes the support springs 31, the upper sweep jaw is again raised to deposit the book upon the springs and the jaws remain open to receive the next book as it issues from the rollers.

The operating speed of the machine in the past has been limited to the production of approximately ten books per minute and with the automatic discharge mechanism the same machine can be run at a production rate of twenty or more books per minute with reliable performance. Greater operating speeds can be reached by making certain alterations in the rounding machine structure since the discharge apparatus is found to operate efficiently at a speed greater than the normal top speed of the rounding machine.

Arm structure

Figure 3:
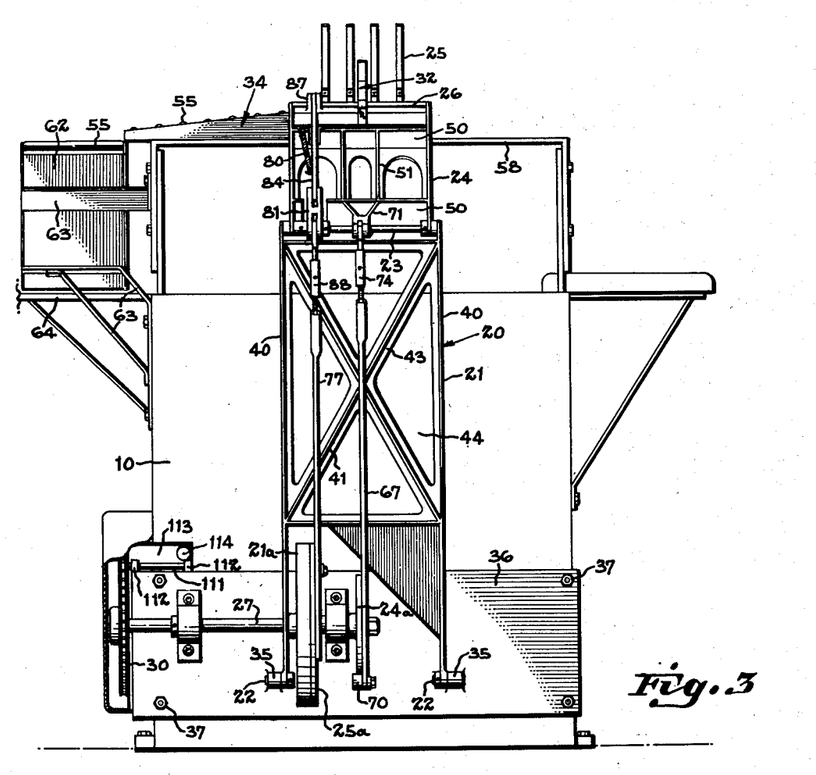
Figure 3 is a rear view of the rounding machine showing the general arrangement of the discharge apparatus, actuating cams and the conveyor section with which it cooperates.
Figure 6:
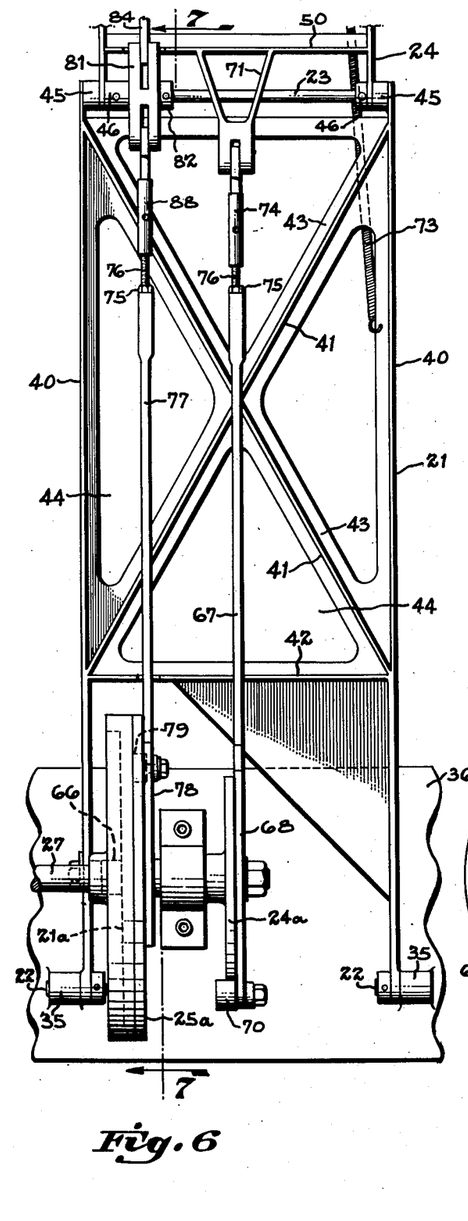
Figure 6 is a developed view of the primary or vertical arm section, together with the actuating links and cams for operating the several sections.

Described in greater detail, the pivot shaft 22 for the primary arm 21 is journalled upon a pair of bearing blocks 35—35 (Figure 6), carried upon a plate 36 which is secured to the rear wall of the machine base. Plate 36 may be adjusted with respect to the base by means of the adjustment screws 37 so as to regulate the position of the articulated arm assembly accurately with respect to the machine parts with which it cooperates (Figure 3). In order to provide a rigid but lightweight structure, the arm sections preferably are formed of aluminum castings. As shown in Figures 3 and 6, the primary arm 21 consists of a box section having spaced side flanges 40—40, stiffened by cross bracing 41. A strut 42 extends crosswise between the side plates at the lower portion of the arm to maintain the spaced relationship of the side members. In order to further decrease the weight of the unit, the base panel 43 is skeletonized by forming openings 44 in areas which are not critical to the strength of the arm.

At the swinging end of the primary arm a pair of collars 45—45 are formed on the side flanges to journal the pivot shaft 23 of the secondary arm. As shown in Figure 9, the secondary arm 24 is likewise provided with collars 46—46 formed on its side flanges 47—47 to receive the pivot shaft. The secondary arm is fabricated in substantially the same manner as the primary arm and as detailed in Figure 8 it likewise includes a base panel 48, a pair of cross members 50—50, and a pair of transverse struts 51—51 extending between the flanges for stiffness. Upon the swinging end of the secondary arm there is formed a pair of bearing blocks 52—52 for journalling the counterturned ends 53 of the pivot shaft 26 which carries the fingers 25. The pickup fingers 25 are spaced apart and adapted to reside between the rollers 55 of the gravity conveyor section 34. The outer end of each finger includes an upwardly bent ear 56, and the rearward ends are secured to shaft 26 preferably by welding.

In order to provide lateral stability for the articulated arm, the primary and secondary arm sections are of substantial width. Thus the pivot points of the arms are widely spaced and slight looseness in the pivots will not cause any substantial lateral displacement at the free end of the arm. This arrangement permits the arm to be positioned accurately with respect to the support rails and aligns the pickup fingers precisely with respect to the conveyor slots, thereby avoiding interference as the fingers enter them upon depositing the book upon the conveyor.

Figure 4:
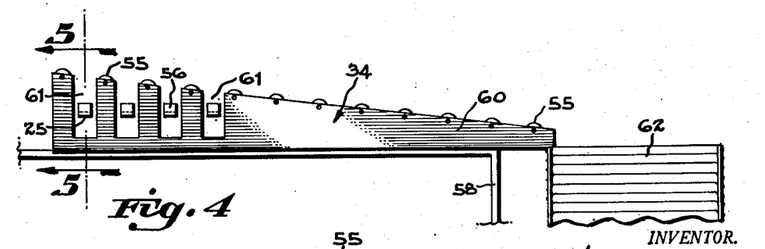
Figure 4 is an enlarged fragmentary view of the conveyor system shown in Figure 3 as viewed from the front of the rounding machine.
Figure 5:
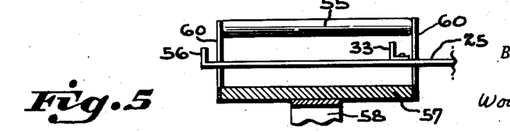
Figure 5 is a sectional view taken on line 5—5 Figure 4 detailing the book receiving portion of the conveyor system, the pickup fingers being shown in book depositing position between the rollers.

The conveyor 34 as best shown in Figures 4 and 5 consists of a base plate 57 supported upon the machine frame by brackets 58 and having spaced side flanges 60—60 upon which the rollers 55 are journalled. As shown in Figure 4 the base plate is horizontal and the upper edges of the side flanges are inclined in order to provide the necessary gravity feed. The upper portion of the side flanges is provided with a series of slots 61 corresponding to the fingers to permit the fingers to pass between the rollers as the book is deposited upon them. The discharge conveyor section 62 is substantially of the same construction as section 34 and is disposed at right angles to the first section such that the finished book drops from the lower end of conveyor 34 and rolls forwardly down the inclined conveyor 62. Conveyor 62 is mounted upon the machine frame by brackets 63 associated with those for mounting the conveyor 34 and includes a table 64 at its lower end to receive the discharged books. In case the machine is installed in a production line, the table is omitted and the conveyor arranged to discharge upon a line conveyor running to the various machines.

Figure 7:
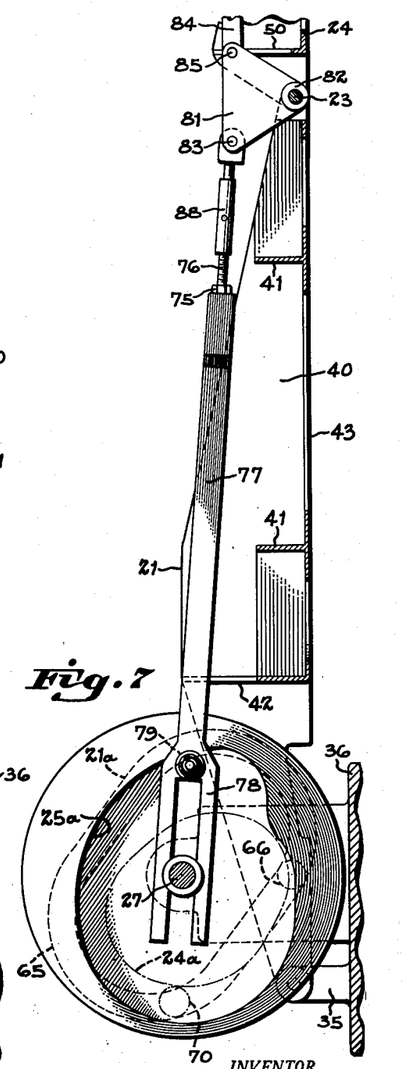
Figure 7 is a sectional view taken on line 7—7 Figure 6 further detailing the primary arm and its associated parts.

The cams 21a, 24a and 25a which actuate the respective arm sections 21, 24 and 25 are connected by rollers to the arm sections which they operate. As shown in Figures 1 and 7, the primary arm section 21 is connected to the oval track 65 of cam 21a by a roller 66 rotatably mounted upon one of the side flanges 40 of the arm. Rotation of the cam in the direction indicated will swing the tracked roller and arm through two throws upon each revolution of the cam.

The secondary arm 24 is actuated by its cam 24a by means of the link 67 having a fork 68 formed at its lower end straddling the cam shaft 27 and having rotatably mounted upon its lower end a cam roller 70 engaged against the periphery of cam 24a (Figure 6). The upper end of link 67 is connected to a lug 71 extending from the rearward end of arm 24. Lug 71 extends beyond the pivot center 23 so that the link 67 is under tension against the overhanging weight load of arm 24 and thereby constantly urging roller 70 upwardly against the cam. In addition there is provided a spring 73 interposed in tension between the primary and secondary arms to maintain tension upon the link at all times. The link 67 near its upper end includes a turnbuckle 74 to provide a length adjustment to regulate with precision the angular position of arm 24. The turnbuckle is locked in adjusted position by a nut 75 threaded upon the screw shaft 76.

The movements generated by the cam 25a are transmitted to the pickup fingers 25 by a link 77 having its lower end forked as at 78 straddling the cam shaft 27 with a follower roller 79 engaged against the periphery of cam 25a (Figure 7). The link 77 is biased by a tension spring 80 so arranged that the link 77 and roller 79 are in constant engagement against the inside circumference of cam 25a. Cam 25a preferably consists of a plate having the cam configuration machined in it, the plate being secured by screws directly against the rear surface of cam 21a.

The movements developed by cam 25a are transmitted through link 77 to a quadrant lever 81 pivoted loosely upon the shaft 23 and held in lateral position by a collar 82 fixed to the shaft. The upper end of link 77 is pivotally connected as at 83 to the swinging end at one side of the quadrant lever and a branch link 84 which is angularly related to link 77 has its end connected as at 85 to the quadrant lever at the other side of its swinging end. Branch link 84 extends forwardly and is pivotally connected as at 86 to a lever 87 extending upwardly from the pivot shaft 26 of the fingers. The quadrant lever 81 and actuating lever 87 are forked with the ends of the links residing between the forks. The link 77 is provided with a turnbuckle 88 similar to turnbuckle 74 to permit the position of the pickup fingers to be adjusted to suit the requirements of the machine. It will be observed that the quadrant lever 81 will transmit the movements of link 77 to the angular branch link 84 independently of the movement or position of the primary and secondary arms so that the pickup fingers 25 are free to move relative to the arm sections.

Figure 10:
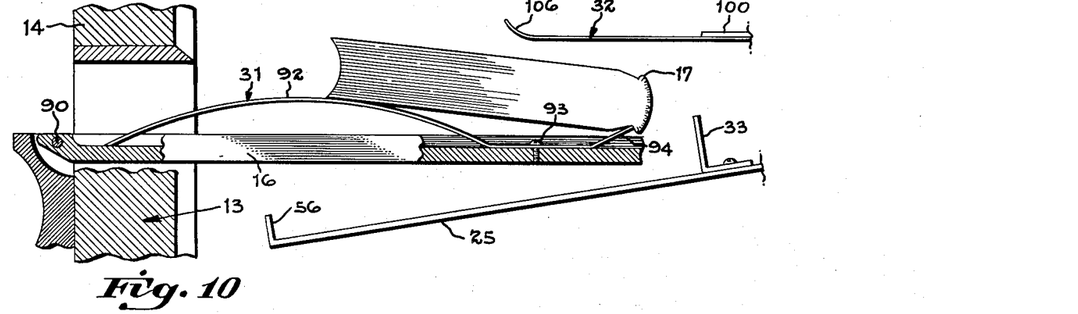
Figure 10 is an enlarged fragmentary sectional view taken from Figure 1, detailing the arrangement of the support rails and the springs thereon for sustaining the finished book, the pickup fingers being shown in the position they assume at the start of a discharge operation.
Figure 11:
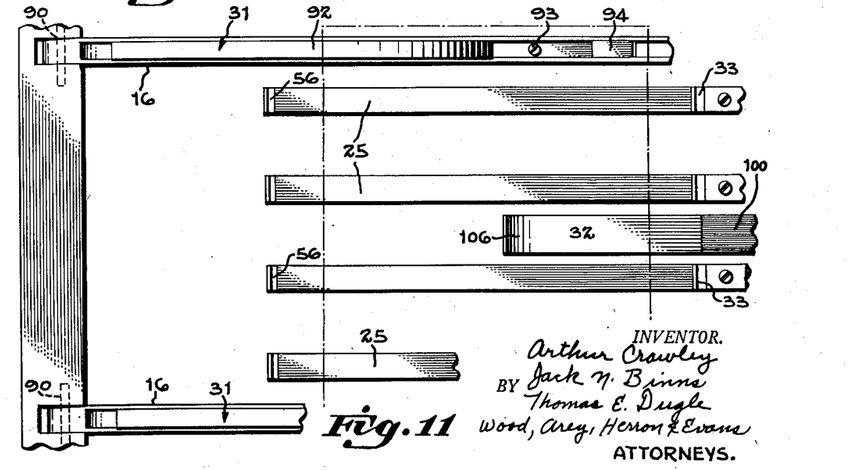
Figure 11 is a fragmentary plan view projected from Figure 10 further illustrating the relationship of the pickup fingers, support rails and springs.

As shown in Figures 10 and 11 the book support rails 16 have their forward ends pivotally connected as at 90 to the frame of the machine and the sweep is provided with openings which slideably support the rails, leaving their inner ends free to swing in response to the arcuate movements of the sweep. In cross section the support rails are channel-shaped to receive the flat leaf springs 31 which are mounted upon their upper surface. As shown in Figure 10, each spring proper is curved upwardly as indicated at 92 and its rearward end is secured by screw as 93 to the free end of the support rail. The rearward end of each spring includes an angular spur 94 extending upwardly from the guide rail in a position to engage the shoulder or bead 17 of the book as the book is released from the sweep.

When the book is clamped in the sweep and swung rearwardly toward the rounding tool, the curved portion and spur deflect downwardly to permit the book to pass over them. During the forward movement of the sweep, the clamping pressure is relaxed before the bead is engaged by the spurs; thus the spurs are in position to wedge against the bead and restrain the book while the sweep continues its forward movement. After being stopped by the spurs, the book supported in an inclined position upon curved portion of the springs with its edge precisely aligned with respect to the pickup fingers.

Figure 12:
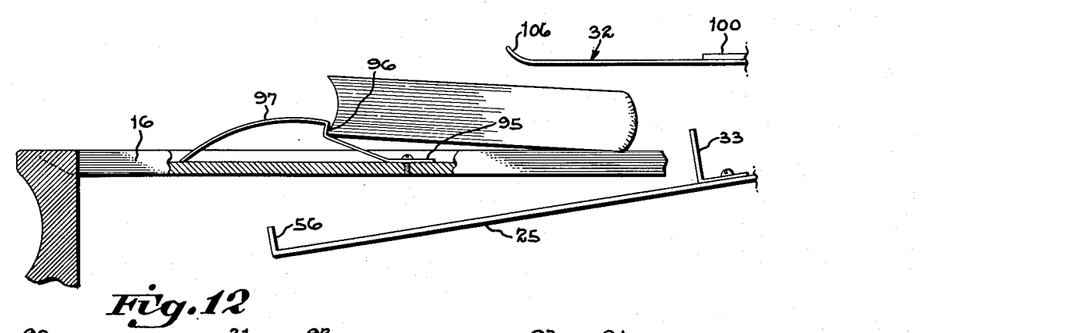
Figure 12 is a view similar to Figure 11 illustrating the book positioning springs which are utilized to support books in which the rounding beads are omitted, the spring being arranged to abut the forward or unbound edge of the book instead of the bead.

The present machine is designed also to finish books of a certain class in which the rearward edge is rounded only, with the backing shoulders 17 omitted. In order to position such books with respect to the fingers, the support rails are provided with the modified leaf springs shown in Figure 12, which are arranged to engage the forward or unbound edge of the book in the manner disclosed. This positioning spring, anchored as at 95 by means of a screw threaded into one end of the spring, is bent to provide an abutment or step 96 which is presented to the unbound edge of the book during its return motion, to index it precisely in pickup position with respect to the fingers. The modified spring includes a curved portion 97 extending forwardly similar to the curved portion of the bead engaging spring. The curved portion presents a yieldable support surface to prevent interference during rearward feed and to provide a positive stop during the forward feed in the same manner as the above described structure.

Figure 8:
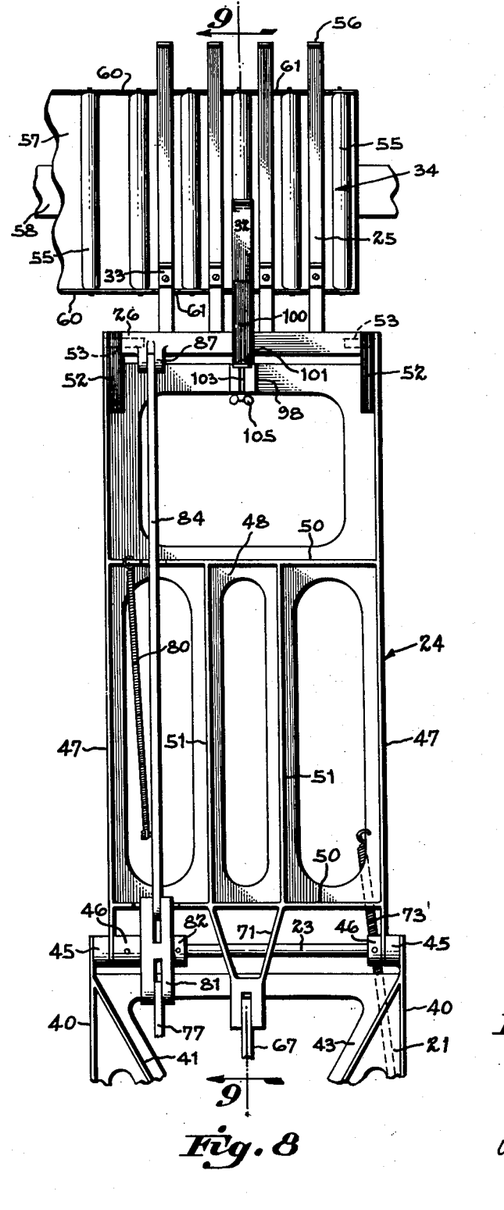
Figure 8 is a developed view of the secondary arm and pickup fingers as a continuation of Figure 6, the pickup fingers being shown in cooperating position with respect to the conveyor section.
Figure 9:
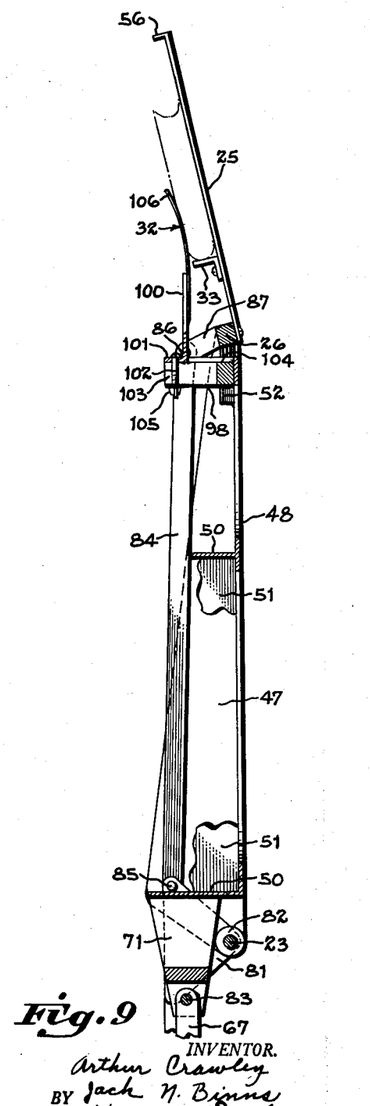
Figure 9 is a sectional view taken on line 9—9 Figure 8, further illustrating the secondary arm and pickup fingers.

The clamp spring 32, which cooperates with the pickup fingers, is mounted in fixed position upon the forward end of the secondary arm 24 upon a lug 98 which is secured rigidly upon the end of the secondary arm (Figures 8 and 9). The spring 32 has its rearward end rigidly mounted upon an angle bracket 100 which extends forwardly of lug 98 and which includes a foot 101 which is clamped to the lug by means of a screw 102 passing through a vertical slot 103 formed in the lug. The forward face of the lug is machined to form a channel 104 to receive the foot 102. The inner end of screw 102 is provided with a wingnut 105 to permit the bracket to be adjusted vertically with respect to the lug and thereby to vary the spacing between the spring and fingers so as to accommodate books of various thicknesses. The free end of the clamp spring is curved upwardly as at 106 so as to provide smooth surface for engagement upon the book. As the fingers swing toward the spring with the rounded edge of the book engaged against the stop lugs 33, the free end of the hold-down spring contacts the book approximately at an intermediate position of its width to provide a yieldable but constant pressure upon the book. Thus, minor variations in the thickness of the books will be accommodated automatically by the spring.

As previously noted, the actuating links are provided with turnbuckles to permit their individual ranges of movement to be regulated and the position of the arm as a unit may be regulated by the screws 37 passing through the base plate 36. Since adjustment of the base plate will displace the sprocket 28 relative to sprocket 29, a slack takeup device is provided for the sprocket chain 30. As shown in Figures 1 and 3, the takeup device constitutes an idler sprocket 108 loosely mounted upon a swinging arm 109 carried by a bracket 110 secured upon the upper edge of base plate 36. The arm is fixed upon a shaft 111 journalled in lugs 112—112 extending from the bracket. The opposite end of shaft 111 includes a lever 113 having its lower end fixed to the shaft and having an adjustment screw 114 threaded through its upper end. The end of screw 114 bears against a lug 110 rising from the base plate 36 so that rotation of screw 114 swings the arm and sprocket in an arc and thus controls the slack in chain 30.

Having described our invention, we claim:

1. In an automatic discharge apparatus for a book finishing machine or the like, an articulated arm constituting a substantially vertical arm, a substantially horizontal arm pivotally mounted upon the vertical arm, a plurality of pickup fingers pivotally mounted upon the free end of the horizontal arm, individual cam means connected to the respective arms and pickup fingers for pivotally swinging the same with respect to one another during the operating cycle of the finishing machine, a limb secured upon the free end of the horizontal arm and overhanging the pickup fingers, the said limb being formed of flexible material and adapted to engage a book disposed upon the said fingers when the fingers are swung upwardly toward the limb and being adapted to disengage the book when the said fingers swing downwardly to a book discharge position.

2. In a discharge apparatus for a book rounding machine, book support means, a vertical arm, a bearing pivotally mounting the lower end of the vertical arm, a cam shaft, a cam mounted on the cam shaft adjacent the lower end of the vertical arm, a cam follower mounted in the lower portion of the vertical arm and in camming with the cam, said cam being adapted to oscillate the vertical arm upon rotation of the cam, a horizontal arm having a bearing at its rearward end pivotally connecting the rearward end to the upper end of the vertical arm, the horizontal arm having a lever extending rearwardly beyond said bearing, a second cam mounted upon said cam shaft, a cam follower in camming engagement with the second cam, a link extending upwardly from the cam follower, the upper end of said link being connected to the lever extension of the horizontal arm adapted to oscillate the second arm upon rotation of the second cam, spaced pickup fingers pivotally mounted upon the free end of the horizontal arm, a third cam mounted on said cam shaft, a follower in camming engagement with the third cam, an articulated linkage having an end connected to said follower, the opposite end of the articulated linkage extending to the pickup fingers and adapted to oscillate said fingers with respect to the horizontal arm upon rotation of the third cam, and means for rotating said cam shaft and cams in unison, said cams having camming surfaces arranged during rotation of the cams to advance and retract the vertical arm and to raise and lower the horizontal arm and pickup fingers in timed relationship with one another whereby the pickup fingers are advanced and retracted in a combined horizontal and vertical path of movement to engage and withdraw a book from the book support means.

3. In a discharge apparatus for a book rounding machine, book support means, a vertical arm, a bearing pivotally mounting the lower end of the vertical arm, a cam shaft, a cam mounted on the cam shaft adjacent the lower end of the vertical arm, a cam follower mounted in the lower portion of the vertical arm and in camming engagement with the cam, said cam being adapted to oscillate the vertical arm upon rotation of the cam, a horizontal arm having a bearing at its rearward end pivotally connecting the rearward end to the upper end of the vertical arm, the horizontal arm having a lever extending rearwardly beyond said bearing, a second cam mounted upon said cam shaft, a cam follower in camming engagement with the second cam, a link extending upwardly from the cam follower, the upper end of said link being connected to the lever extension of the horizontal arm adapted to oscillate the second arm upon rotation of the second cam, spaced pickup fingers mounted upon the free end of the horizontal arm, a third cam mounted on said cam shaft, a cam follower in camming engagement with the third cam, a quadrant lever pivotally mounted upon the bearing which pivotally connects the rearward end of the horizontal arm to the vertical arm, a link extending upwardly from the cam follower of the third cam to said quadrant lever, a second link extending horizontally from the quadrant lever to the pickup fingers adapted to oscillate said fingers with respect to the horizontal arm upon rotation of the third cam, and means for rotating said cam shaft and rotating said cams in unison, said cams having camming surfaces adapted during rotation of the cams to advance and retract the vertical arm and to raise and lower the horizontal arm and pickup fingers in timed relationship with one another whereby the pickup fingers are advanced and retracted in a combined horizontal and vertical path of movement to engage and withdraw a book from the support means.

4. In a discharge apparatus for a book rounding machine adapted to transfer books from a book support member to a discharge conveyor, a vertical arm, a bearing pivotally mounting the lower end of the vertical arm, a cam shaft, a cam mounted on the cam shaft adjacent the lower end of the vertical arm, a cam follower mounted in the lower portion of the vertical arm and in camming engagement with the cam, said cam being adapted to oscillate the vertical arm upon rotation of the cam, a horizontal arm having a bearing at its rearward end pivotally connecting the rearward end of the horizontal arm to the upper end of the vertical arm, the horizontal arm having a lever extending rearwardly beyond said bearing, a second cam mounted upon said cam shaft, a cam follower in camming engagement with the second cam, a link extending upwardly from the cam follower, the upper end of said link being connected to the lever extension of the horizontal arm adapted to oscillate the second arm upon rotation of the second cam, spaced pickup fingers pivotally mounted upon the free end of the horizontal arm, a third cam mounted on said cam shaft, a follower in camming engagement with the third cam, an articulated linkage having an end connected to said follower, the opposite end of the articulated linkage extending to the pickup fingers and adapted to oscillate said fingers with respect to the horizontal arm upon rotation of the third cam, and means for rotating said cam shaft and cams in unison, said cams having camming surfaces arranged to retract the vertical arm from the support member and raise the horizontal arm and pickup fingers in timed relationship with one another and thereby withdraw a book from the support member and elevate and deposit the book upon the discharge conveyor during a partial revolution of the cams, the camming surfaces being arranged to advance the vertical arm and lower the horizontal arm and pickup fingers to a position beneath the support member during the remainder of the rotation of the cams whereby the pickup fingers are in position to withdraw the next book from the support member.

ARTHUR CRAWLEY.
JACK N. BINNS.
THOMAS E. DUGLE.

References Cited in the file of this patent

UNITED STATES PATENTS

| Number | Name | Date |
|---|---|---|
| 372,128 | Crawley | Oct. 25, 1887 |
| 1,619,507 | Granstedt | Mar. 1, 1927 |
| 1,835,579 | Westin | Dec. 8, 1931 |
| 1,859,956 | Canfield | May 24, 1932 |
| 2,123,363 | Joplin | July 12, 1938 |
| 2,224,975 | McNamara | Dec. 17, 1940 |
| 2,275,561 | Sahlin | Mar. 10, 1942 |
| 2,413,446 | Glassner | Dec. 31, 1946 |